United States Patent [19]
Foster

[11] Patent Number: 5,996,772
[45] Date of Patent: Dec. 7, 1999

[54] RECIPROCATING SLAT CONVEYORS WITH PRESSURE SEALS

[76] Inventor: Raymond Keith Foster, P.O. Box 1, Madras, Oreg. 97741

[21] Appl. No.: 09/322,722

[22] Filed: May 28, 1999

[51] Int. Cl.⁶ .................................................. B65G 25/04
[52] U.S. Cl. ...................................... 198/750.3; 198/750.4
[58] Field of Search .............................. 198/750.2, 750.3, 198/750.4

[56] References Cited

U.S. PATENT DOCUMENTS

| | | | |
|---|---|---|---|
| Re. 35,156 | 2/1996 | Hallstrom, Jr. | 198/750.3 |
| 5,346,056 | 9/1994 | Quaeck | 198/750.3 |
| 5,547,067 | 8/1996 | Foster | 198/750.3 |

Primary Examiner—James R. Bidwell
Attorney, Agent, or Firm—Delbert J. Barnard

[57] ABSTRACT

Bolt fasteners extend through a bottom wall (38) in longitudinal guide beams (14), to secure the guide beams (14) to transverse frame members (70, 72). The guide beams (14) include sidewalls (40, 42) which extend upwardly from the bottom wall (30) to laterally outwardly extending top flanges (44, 46). The bolts may be installed from above by use of a tool that is inserted into the space between the sidewalls (40, 42). After the guide beams (14) are secured to the frame members (70, 72), bearing/seal members (48) are snap-fitted onto the tops of the support beams (14). Conveyor slats are installed in the spaces between the support beams (14). The conveyor slats (10) include side portions (20, 22) which extend laterally outwardly into positions above the bearing/seal members (48). The side members (20, 22) include downwardly extending beads B which contact the upper surfaces (62) of the bearing/seal members (48).

14 Claims, 4 Drawing Sheets

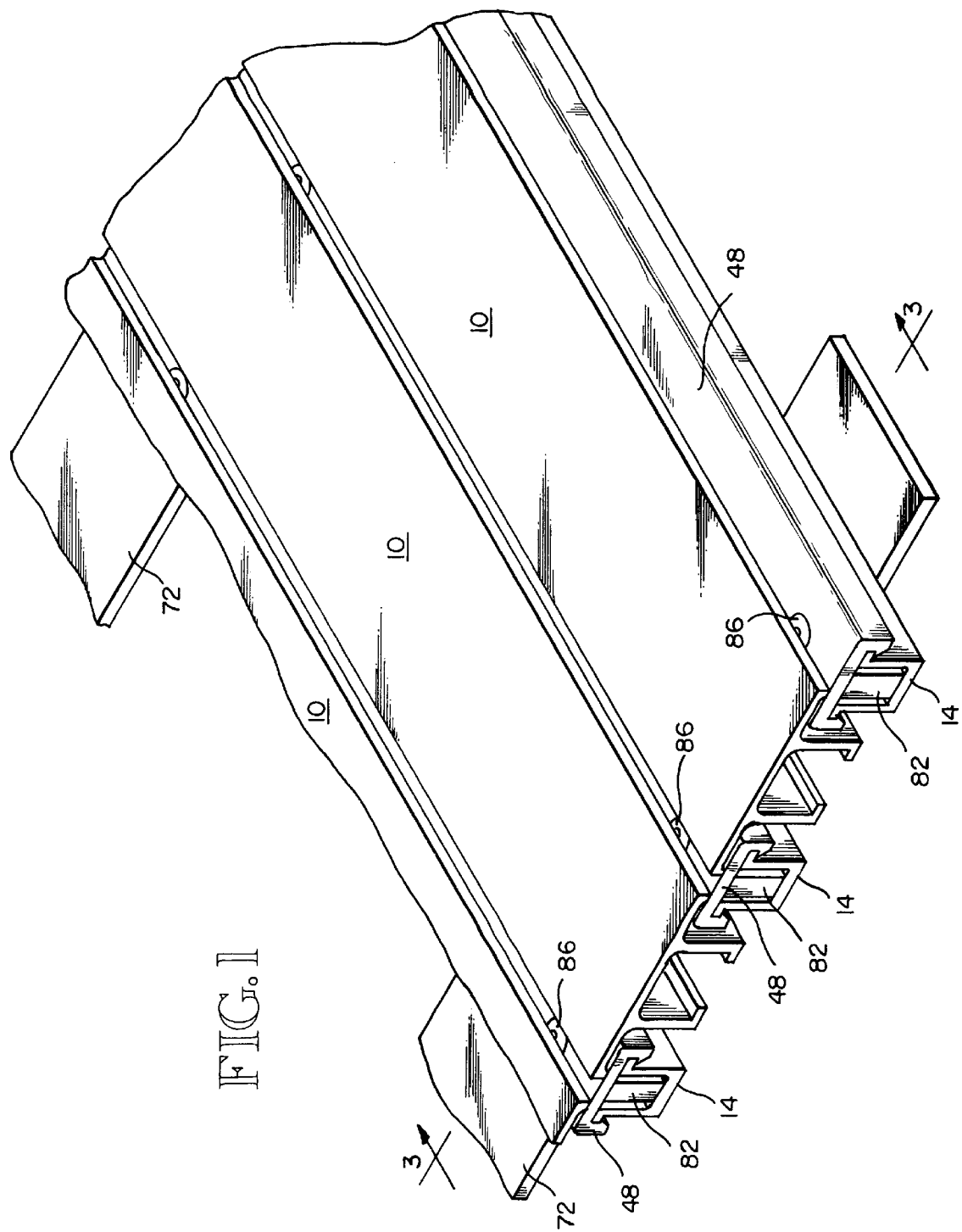

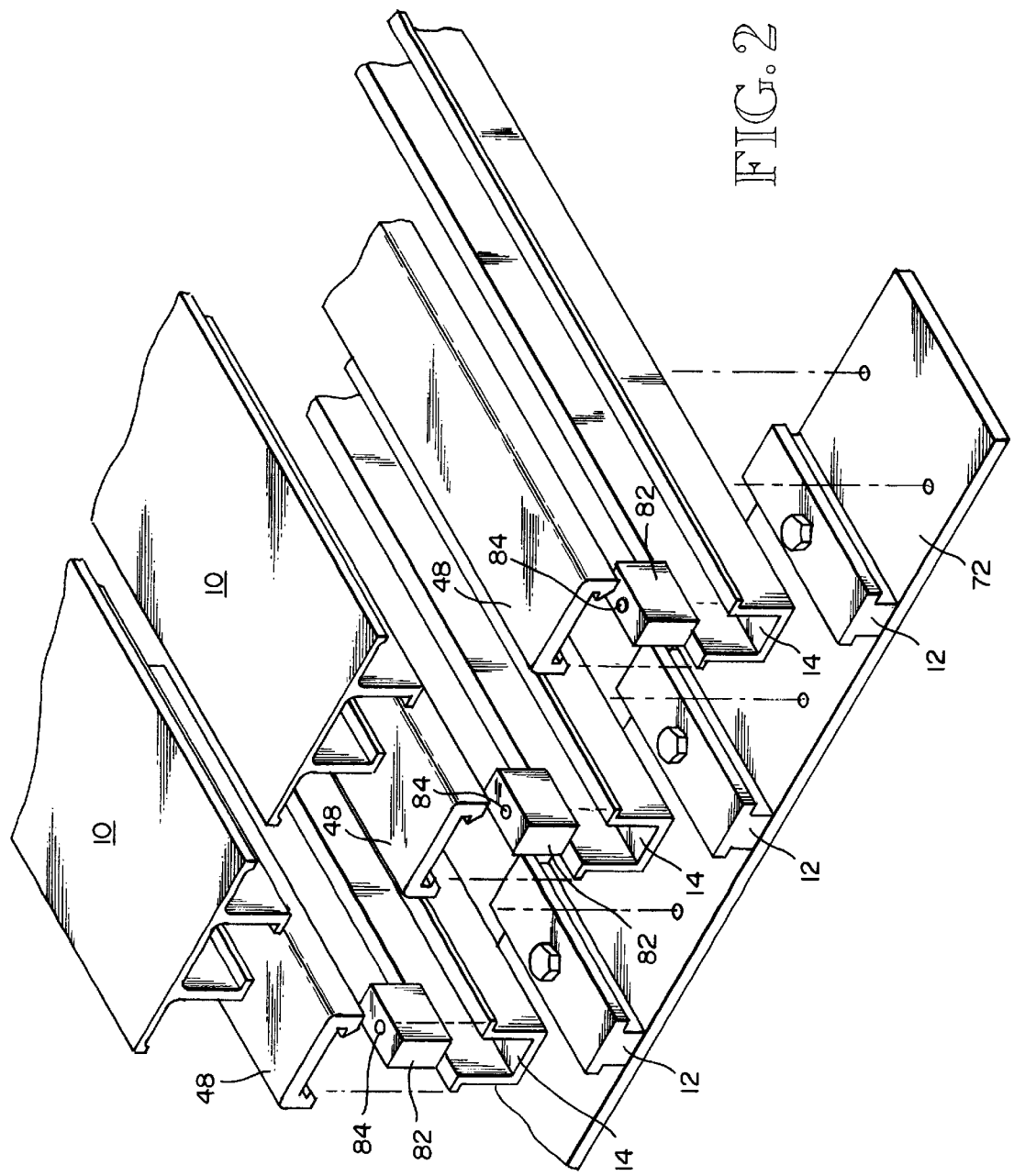

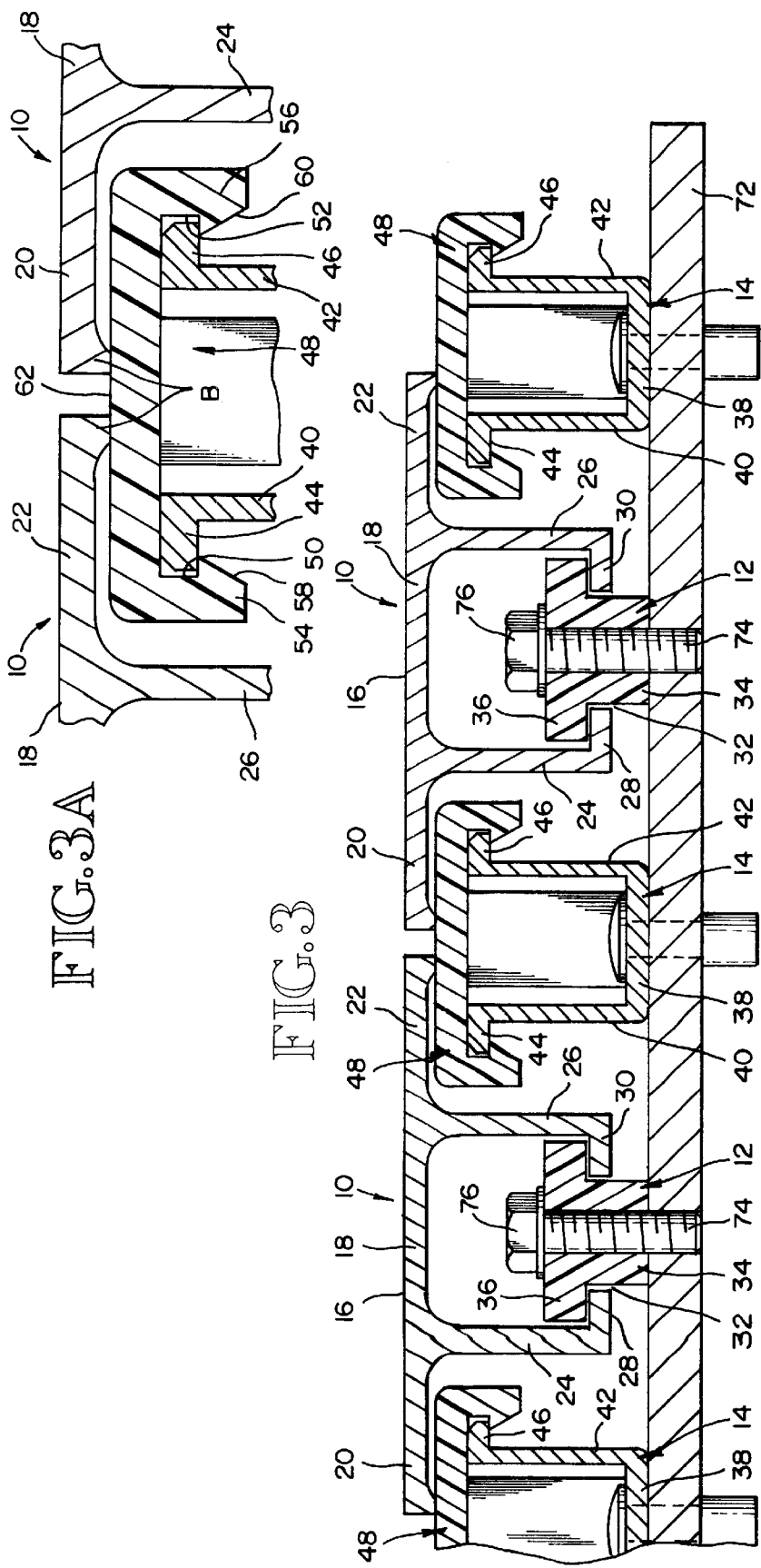

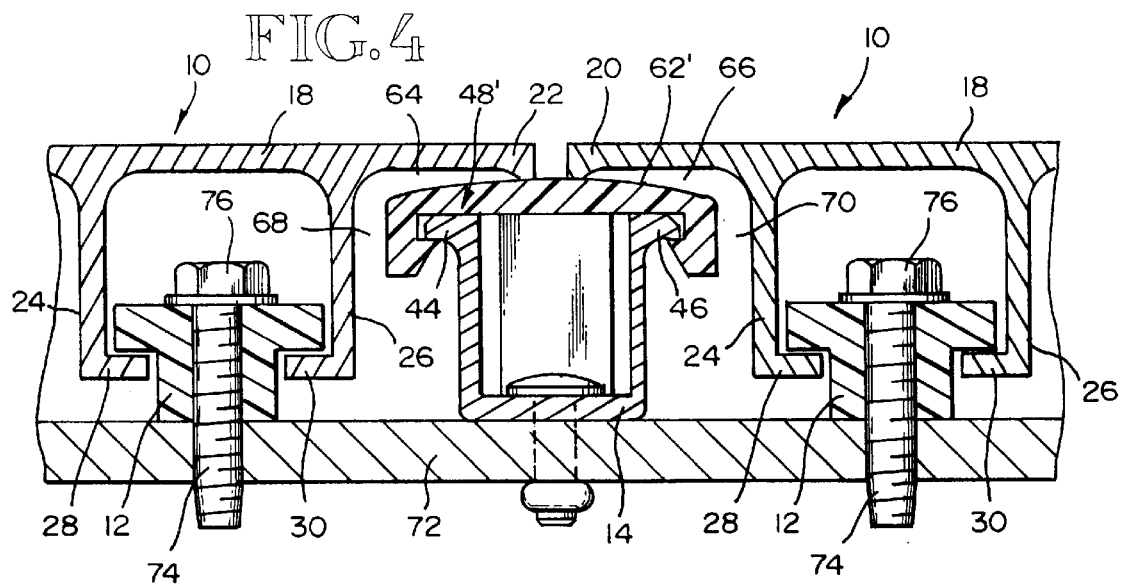
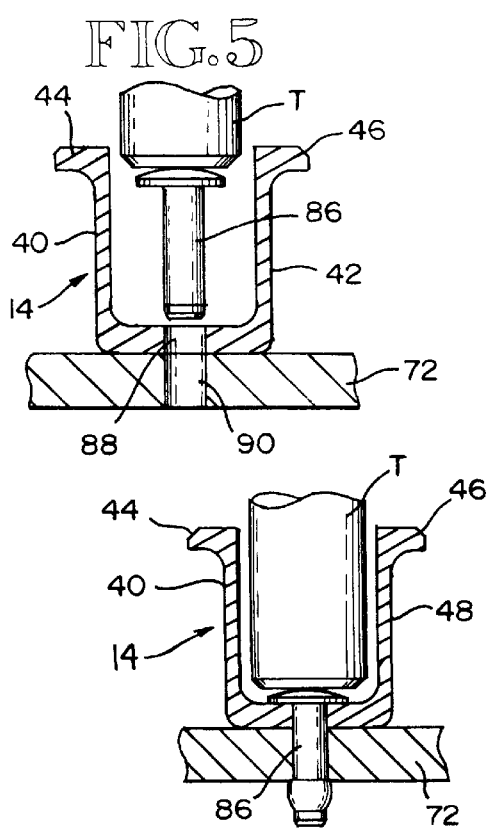
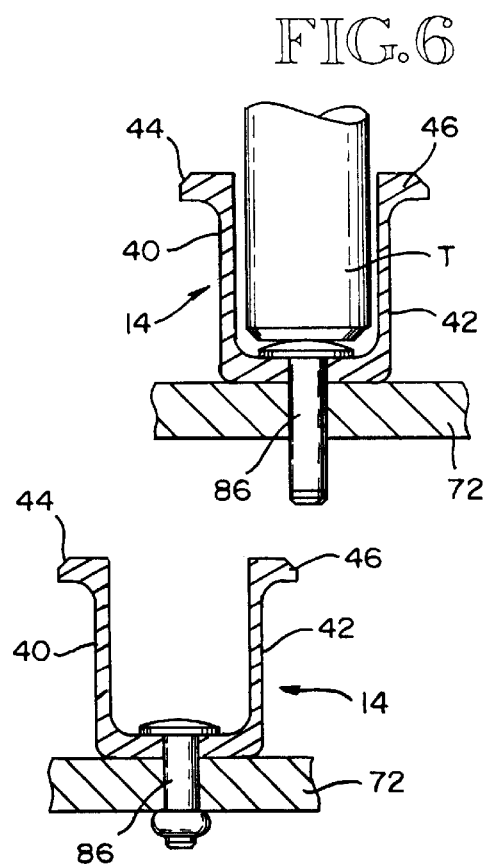

RECIPROCATING SLAT CONVEYORS WITH PRESSURE SEALS

TECHNICAL FIELD

This invention relates to reciprocating slat conveyors. More particularly, it relates to the provision of reciprocating slat conveyors having pressure seal systems formed by longitudinal, depending support and seal beads on the conveyor slats and longitudinal bearing/seal members on support beams that are positioned between the conveyor slats, and to a new way of constructing the support beams and the bearing/seal members, and to a new way of mounting the support beams.

BACKGROUND OF THE INVENTION

U.S. Pat. No. 5,560,472, granted Oct. 1, 1996, to Richard T. Gist, discloses a conveyor slat, bearing, support beam, and seal system which eliminates elastomeric seal members between the conveyor slats which have for many years characterized most of the known reciprocating slat conveyors. In the Gist system, longitudinal support beams are positioned laterally between the conveyor slats. Upper portions of the support beams provide upwardly directed, hard plastic, bearing/seal surfaces. The conveyor slats have upper side portions that overhang the bearing/seal surfaces. These upper side surfaces of the conveyor slats include depending, longitudinal beads that contact and ride on the bearing/seal surfaces. The weight of the conveyor slats, and the weight of any load on the conveyor slats, is transmitted from the conveyor slats to the longitudinal support beams. This weight transfer occurs where the longitudinal slat beads contact and ride on the bearing/seal surfaces. The contact is a substantially narrow line contact. Because the contact occurs along a relatively narrow line, a substantial force is generated which urges the longitudinal beads into a tight sealing contact with the bearing/seal surfaces where there is a load on the conveyor slats. However, because contact occurs along a relatively narrow line, the area of contact is small, resulting in the forces necessary to reciprocate the conveyor back and forth along the support beams being smaller. An object of the present invention is to provide improvements to the pressure seal system that is disclosed by U.S. Pat. No. 5,560,472, for the purpose of making it easier to manufacture and install the components of the system, and to better the ability of the system to rid itself of small particulate material during times when there is no load on the conveyor slats.

The following United States patents show some prior art conveyor systems having some superficial appearance similarity to the systems of the present invention: U.S. Pat. No. 5,088,595, granted Feb. 18, 1992, to Olof A. Hallstrom; U.S. Pat. No. 5,165,525, granted Nov. 4, 1992 to Manfred W. Quaeck; U.S. Pat. No. 5,222,592, granted Jan. 29, 1993, to Manfred W. Quaeck; U.S. Pat. No. 5,228,556, granted Jul. 30, 1993, to Manfred W. Quaeck; and U.S. Pat. No. 5,323,894, granted Jun. 28, 1994, to Manfred W. Quaeck. These patents should be carefully considered for the purpose of putting the present invention into proper perspective relative to the prior art.

BRIEF SUMMARY OF THE INVENTION

Reciprocating slat conveyor systems of the present invention are basically comprised of side-by-side conveyor slats, each having laterally outwardly extending opposite side portions. Each side portion includes a depending, longitudinal support and seal bead having a lower edge that contacts and slides along a longitudinal bearing/seal surface that is provided on a longitudinal support beam that is below it According to the invention, a longitudinal support beam is positioned below each adjoining pair of conveyor slats, below adjacent upper side portions of the adjoining conveyor slats. A longitudinal bearing/seal member extends along and is secured to each support beam. Each support beam has a bottom wall and a pair of sidewalls connected to and extending upwardly from the bottom wall to a top opening. The support beams include a pair of outwardly directed flanges, one extending laterally outwardly from each sidewall of the support beam, adjacent the top opening. Each longitudinal bearing/seal member includes laterally directed slots that receive the flanges on its support beam. The flanges provide tongue portions and the slots provide groove portions of tongue-and-groove connections between the support beam and the bearing/seal member.

According to an aspect of the invention, the support beams sit down on support members and are secured to the support members by fasteners that extend through the bottom wall of the support beam and the support member below it. Preferably, the fastener has an enlarged upper end portion that bears downwardly against the bottom wall of the support beam. Preferably, the enlarged upper end portion of the fastener is a head on a bolt fastener that bears downwardly on the bottom wall on the support beam. Preferably also, this fastener includes a nut secured to the bolt below the bottom wall of the support beam. Preferably, the nut and bolt fastener is of a type that can be installed from above the support beam.

According to an aspect of the invention, the bearing/seal member has a central portion that extends between the laterally directed slots and over the top opening. Preferably, the laterally directed slots in the bearing/seal member are directed laterally inwardly.

These and other advantages, objects and features will become apparent from the following description of the illustrated embodiments, from the illustrations of the embodiments, from the principles that are exemplified by the embodiments, and from the claims, all of which provide a description of the invention.

BRIEF DESCRIPTION OF THE DRAWINGS

In the drawings, like reference numerals and letters are used to designate like parts throughout the several views, and FIG. 1 is a fragmentary pictorial view of a reciprocating slat conveyor, showing portions of three longitudinal support members, three bearing/seal members, two conveyor slats and two supporting frame structure;

FIG. 2 is an exploded pictorial view of most of the conveyor components shown by FIG. 1, such view showing three guide beams and three end blocks that are secured to the support members onto which the bearing/seal members are secured;

FIG. 3 is a fragmentary end view of the reciprocating slat conveyor components shown by FIGS. 1 and 2, such view showing fasteners used for connecting the support beams to supporting frame structure and fasteners used to secure the hold down members to the supporting frame structure;

FIG. 4 is a view similar to FIG. 3 but of a different convex top construction for the bearing/seal members;

FIG. 5 is a fragmentary sectional view at the location of a fastener used for fastening the longitudinal support beams to the frame structure showing a fastener and a tool used for securing the fastener, being inserted from above into the open channel space of the longitudinal support beam;

FIG. 6 is a view like FIG. 5, but with the tool in a bottom position and the fastener in openings for it in the support beam and the support member below it;

FIG. 7 is a view like FIGS. 5 and 7, showing the tool being operated to secure the fastener; and FIG. 8 is a view like FIGS. 5–8 showing the fastener installed and the tool removed.

DETAILED DESCRIPTION OF THE INVENTION

A substantially complete reciprocating slat conveyor system is disclosed by my U.S. Pat. No. 5,165,524, granted Nov. 24, 1992, and entitled Reciprocating Floor Conveyor. That patent discloses one form of drive unit for reciprocating the conveyor slats. Other suitable drive units, each having its own particular advantages, are disclosed by my U.S. Pat. No. 5,390,781, granted Feb. 21, 1995, and entitled Mounting Assembly and Method for Reciprocating Slat Conveyor, by my U.S. Pat. No. Re. 35,022, granted Aug. 22, 1995, and entitled Reduced Size Drive/Frame Assembly for a Reciprocating Floor Conveyor, and by my U.S. Pat. No. 5,605,221, granted Feb. 25, 1997, and entitled Drive Unit With Bearing Mount. The contents of all these patents are hereby incorporated herein by this specific reference.

My aforementioned U.S. Pat. No. 5,165,524, with reference to FIGS. 2–6 of that patent, describes the most popular operational sequence of reciprocating slat conveyors. FIGS. 7 and 8 of that patent show a typical framework that forms the base of the conveyor. It includes opposite side beams (designated 12 in that patent) interconnected by a plurality of longitudinally spaced apart transverse drive beams (designated 18 in that patent). Longitudinal guide beams (designated 20 in that patent) are mounted on the transverse beams 18. Bearings (designated 50 in that patent) are secured to the guide beams 20. The conveyor slats (designated 40 in that patent) sit down on and engage the bearings 52. The present invention relates to a similar arrangement but involves a different construction of the conveyor slats, the guiding and supporting beams for the conveyor slats, and the bearing and seal members that are associated with the conveyor slats. The system of the present invention has some superficial resemblance to the systems disclosed in my U.S. Pat. No. 5,850,905, granted Dec. 22, 1998, and entitled "Reciprocating Slat Conveyors With Pressure Seals."

FIGS. 1–4 herein show a reciprocating slat conveyor construction that is similar to yet different from the conveyor construction disclosed by my aforementioned U.S. Pat. Nos. 5,560,472 and 5,850,905. The present construction is similar in that the conveyor slats 10 are guided by longitudinal guide beams 12 and are supported independently of the guide beams by longitudinal support beams 14. The differences lie in the construction of the guide beams 12, the support beams 14 and bearing/seal members that are secured to the support beams.

A typical slat conveyor may measure somewhere between twelve to twenty-four slats wide and between twenty to fifty feet in length. The conveyor slats 10 may include a plank-like upper surface 16 that measures between three and a half to six inches in width. The upper or plank portion 16 is divided into three sections. There is a center section 18 that is flanked by two opposite side sections 20, 22. Depending legs 24, 26 depend from each location where the center section 18 meets a side portion 20, 22. Each depending leg 24, 26 includes a laterally inwardly directed bottom flange 28, 30. The flanges 28, 30 define between them a longitudinally extending slot opening 32. The guide beams 12 each have a narrow base portion 34 and a wider top portion 36. The base portion 34 is narrower than the slot opening 32 whereas the top portion 36 is wider than the slot opening 32. Preferably, there is a loose fit of the conveyor slats 10 on the guide beams 12. This is done so that when there is no load on the conveyor slats 10, the conveyor slat 10 can move in position relative to the guide beams 12, both horizontally and vertically. The purpose of this feature is described later in this document.

According to the invention, the support beams 14 are flanged channel members. Each comprises a bottom wall 38 that extends between opposite sidewalls 40, 42. The sidewalls 40, 42 extend upwardly from and substantially perpendicular to the bottom wall 38. The tops of the channel beams 14 are open. A pair of flanges 44, 46 project laterally outwardly from the sidewalls 40, 42, at the tops of the beams 14.

A longitudinal bearing/seal member 48 sits down on and is secured to each support beam 14. The support beams 14 and the bearing/seal members 48 extend the full length of the conveyor. As best shown by FIG. 3A, each bearing/seal member includes laterally directed slots 50, 52 which receives the flanges 44, 46 on the support beams 14. The flanges 44, 46 provide tongue portions and the slots 50, 52 provide groove portions of tongue-and-groove connections between the support beam 14 and the bearing/seal member 48. A flange 54 is positioned below the slot 50 and a flange 56 is positioned below slot 52. Flange 54 includes a sloping surface 58 and flange 56 includes a sloping surface 60. Flanges 54, 56 extend inwardly towards each other. The sloping surfaces 58, 60 slope downwardly and outwardly. This allows the bearing/seal member 48 to be snap-fitted onto the flanges 44, 46. As will be apparent from FIG. 3A, the bearing/seal member 48 is set down onto the guide beam 14, with its sloping surfaces 58, 60 contacting the upper outside edges of the flanges 44, 46. These edges may be beveled to form edge surfaces that slope downwardly and outwardly. Following placement of the bearing/seal member 48 on the flanges 44, 46, a downward force is applied to the bearing/seal member 48, to cause it to snap in place. O/e/tp cause the flanges 44, 46 to snap into the slots 50, 52. As the bearing/seal member 48 is pushed downwardly, the sloping surfaces 58, 60 will slide downwardly on the beveled upper edges of the flanges 44, 46. The beveled surfaces will force the flanges 54, 56 apart until the space between them is made large enough to pass the upper width of the support beam 14. Once the flanges 44, 46 are within the slots 50, 52, the flanges 54, 56 will resume their static positions. In these positions, they will be below the flanges 44, 46, as illustrated.

As shown by FIGS. 3 and 3A, the top portions of the bearing/seal members 48 extend over the top opening into the support beam 14. Even though there is an open space below it, the center portion of the bearing/seal member 48 is relatively stiff and can support the weight of the slats 10 and the load that is on the slats 10.

According to the invention, the upper side portions 20, 22 of the conveyor slats 10 each includes a depending longitudinal support and seal bead B having a lower edge that contacts and slides along the longitudinal bearing/seal surface provided by the upper surface 62 of the bearing/seal member 48. The beads B may be depending lips or flanges that form the outer edge boundaries of the side portions 20, 22 of the conveyor slats 10. The lower edges of the beads B may be laterally rounded, laterally sharp edged, or laterally blunt, but making a relatively narrow line contact with the bearing slat seal surface 62.

The bearing/seal members 48 are constructed from a high molecular weight resonance material, sometimes referred to in the trade a UHMW material. This material is available from several manufacturers. It is strong and is easily formed to the desired configuration. The material has exceptionally low surface abrasion which translates into it providing an excellent bearing relationship between the conveyor slats 10 and the support beams 14. The substantially narrow line contact between the depending beads B and the bearing/seal members 48 provides a seal that when there is a load on the conveyor seals against the passage of particulate material, including "fines" of 100 mesh or smaller, from the region above the conveyor slats 10 to the region below the conveyor slats 10. When the conveyor is under load, the contact of the lower edges of the beads B with the bearing/seal surfaces 62 of the bearing/seal members 48, provides an effective and very simple seal against the movement of particulate material downwardly to below the conveyor slats 10. Over time, in response to reciprocal movement of the conveyor slats 10, the contact of the bead edges with the bearing/seal surface may form grooves in the bearing/seal surface. At the same time, because the contact of the conveyor slats 10 with the bearing/seal members 48 occurs along relatively narrow lines, and because the bearing/seal material has very low friction characteristics, there is a minimum of resistance to sliding movement of the conveyor slats 10 front to rear and back along the bearing/seal members 48.

According to an aspect of the invention, the upper surface 62' on the bearing/seal members 48' may be laterally convex. This is shown by FIG. 4. The surfaces 62' may extend laterally outwardly to upper rounded corners and vertical side surfaces that are spaced from the slat walls 24, 26. As a result, there are avenues 64, 66 provided that allow fines that pass the seal regions to move easily into open spaces 68, 70 that are formed between the support beams 14 and the depending leg portions 24, 26 of the conveyor slats 10. The convex nature of the surface 62' encourages fines to gravitate downwardly into the spaces 64, 66.

As discussed above, when there is a load on the conveyor slats 10, the beads B are held into a relatively tight sealing relationship with the bearing/seal surfaces 62, 62', and the migration of fines from above the conveyor slats 10 to below the conveyor slats 10 is substantially arrested. However, when there is no load on the conveyor slats 10, and some fines remain, motion of the conveyor will cause the conveyor slats 10 to want to move up and down and sideways to some extent. This movement is permitted and in effect encouraged by the fact that the conveyor slats 10 merely sit down on the bearing/seal members 48 and there is a loose fit of a guide beams 12 in a space that is defined horizontally between the depending portions 24, 26, and vertically between the top section 16 and the bottom flange portions 28, 30 of the conveyor slats 10. As the conveyor slats 10 move up and down sideways, gaps are open between the beads B and the bearing/seal surfaces 62, 62'. This happens each time the conveyor slats 10 are bounced upwardly off from their support on the bearing/seal members 48. When this happens, the fines migrate through the vertical gaps into the avenues 64, 66. Once in the avenues 64, 66, the fines are influenced by the convex upper surface 62' into migrating into the spaces 68, 70.

The guide beams 12 and the support beams 14 extend longitudinally across transverse frame beams which are longitudinally spaced apart. The upper portions of these beams are designated 72 in the drawing.

As shown by FIGS. 2, 3 and 4, the guide beams 12 may be bolted to the frame members 72. The frame members 72 may be provided with internally threaded openings to receive the threads of bolts 76. Or, the threaded portions of the bolts 76 may extend through openings in the frame members 72 and be secured to nuts (not shown) which are situated below the frame members 72. The guide members 12 are elongated in that they are longer than they are wide and tall. They may extend the full length of the conveyor. Or, they can be constructed in sections that are positioned or are spaced apart longitudinally. FIG. 2 shows relatively short guide beams 12 secured to frame member 70. Additional guide beams 12 will be secured to the frame member 72 and to each additional frame member of this type that the conveyor includes.

FIG. 2 shows a connector block 82 at the end of each support beam 14. The connector block is preferably a block of plastic. The connector blocks 82 are of a height equal to the vertical distance between the upper surface of the bottom wall 38 and the upper surfaces of the flanges 44, 46. A center portion of the bearing/seal member 48 sits on the top of each connector block 82. A fastener 86 (FIG. 1) extends through an opening in the top wall of the bearing/seal member 48 and then through the opening 84 in the block 82. This fastener either screws into a threaded opening in the frame members 70, 72 or extends through an opening in the frame member 70, 72 to be engaged by a nut positioned below the frame member 70, 72. The head of this fastener is countersunk into the upper surface 62 of the bearing/seal member 48 (FIG. 1). This fastener prevents endwise, sideways and up and down movement of the bearing/seal member 48 relative to the guide beam 14.

FIG. 5 shows a bolt extending downwardly from an installation tool T towards openings 88, 90 in the bottom wall 38 of the support beam 14. The bolt head rests on and bears downwardly against the bottom wall 38. A threaded lower portion of the bolt extends through an opening in the frame member 72. A tubular nut is provided on the threaded portion of the fastener.

FIGS. 6 and 7 show the head of the bolt installing tool T situated within the channel space that is formed by and between the sidewalls 40, 42 and above the bottom wall 38. The tool T is shown in the process of installing a type of fastener that can be installed from one side of the connection. In other words, it is not necessary for anyone to be below the conveyor for the purpose of installing a nut. The preferred fastener includes a nut forming member that surrounds the bolt and is inserted through the bolt hole with the bolt. After the nut forming member is below the bolt hole, the tool is operated to pull on the bolt. This creates a bulge in the nut forming member below the member 72, preventing the nut forming member from moving back through the openings 88, 90. This is a very popular and readily available fastener. A user might also want to install the guide beams 14 from above by use of pop rivets. Pop rivets can also be installed from one side of the connection. In this case, it would be installed from above the connection, by use of a tool that is inserted into the channel space of the support beams 14. Of course, it is still possible to use fasteners that require access from both above and below the connection. For example, a bolt can be inserted downwardly through openings in the wall 38 and the frame member, and a nut (not shown) applied to the lower end of the bolt. Or, the bolt can be inserted upwardly through opening in the frame member and the bottom 38, and the nut applied to the threaded upper end of the bolt.

The illustrated embodiments are only examples of the present invention and, therefore, are non-limitive. It is to be understood that any changes in the particular structure, materials and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of claim interpretation, including use of the doctrine of equivalents.

What is claimed is:

1. In a reciprocating slat conveyor composed of side-by-side conveyor slats, each having laterally outwardly extending opposite upper side portions, each said side portion including a depending, longitudinal support and seal bead having a lower edge that contacts and slides along a longitudinal bearing/seal surface on a longitudinal support beam that is below it, a conveyor structure comprising:

a longitudinal support beam positioned between each adjoining pair of conveyor slats, below adjacent upper side portions of the adjoining conveyor slats;

a longitudinal bearing/seal member on each said support beam, extending along and secured to said support beam;

said longitudinal support beam having a bottom wall and a pair of side walls connected to and extending upwardly from said bottom wall to a top opening;

each said support beam including a pair of laterally outwardly directed flanges, one extending laterally outwardly from each side wall adjacent the top opening;

each longitudinal bearing/seal member including laterally directed slots which receive the flanges on its support beam; and wherein said flanges provide tongue portions and the slots provide groove portions of tongue-and-groove connections between said support beam and said bearing/seal member.

2. A conveyor structure according to claim 1, further comprising a support member below said support beam on which said support beam rests, and a fastener connecting said support beam to said support member, said fastener extending through the bottom wall of the support beam.

3. A conveyor structure according to claim 2, wherein said fastener has an enlarged upper end portion that bears downwardly against the bottom wall of the support beam.

4. A conveyor structure according to claim 3, wherein said fastener is a bolt.

5. A conveyor structure according to claim 4, wherein the enlarged upper end portion on the fastener is a head on the bolt that bears downwardly on the bottom wall of the support beam.

6. A conveyor structure according to claim 5, where the fastener further includes a nut secured to the bolt below the bottom wall of the support beam.

7. A conveyor structure according to claim 3, wherein the fastener is a type that can be installed from above the support beam.

8. A conveyor structure according to claim 3, wherein the fastener is a rivet.

9. A conveyor structure according to claim 1, wherein the bearing/seal member has a central portion extending between the laterally directed slots and over the top opening.

10. A conveyor structure according to claim 9, wherein the laterally directed slots in the bearing/seal member are directed laterally inwardly.

11. A conveyor structure according to claim 10, wherein the bearing/seal member has downwardly extending side portions containing said laterally directed slots, said side portions having an inner surface adjacent and below said laterally directed slots, and having an inward and upwardly beveled shape.

12. A conveyor structure according to claim 11, wherein said laterally outwardly directed flanges have an upper surface beveled downwardly and outwardly.

13. A conveyor structure according to claim 9, wherein a cubic spacer block, resting on said bottom wall of said longitudinal support beam, being substantially flush with said central portion of said bearing seal member, through which a fastener having an enlarged upper end portion passes, said fastener extending from a counter-sunk hole in said central portion of said bearing/seal member, through said cubic spacer block, and through said bottom wall of said longitudinal support beam, bearing downwardly on said bottom wall.

14. A conveyor structure according to claim 9, wherein said central portion of said bearing/seal member has an upper surface that is laterally convex, said surface providing the bearing/seal surface that is in contact with said longitudinal support and seal beads.

* * * * *